United States Patent
Young

(10) Patent No.: US 6,761,921 B2
(45) Date of Patent: Jul. 13, 2004

(54) SUSHI MOLD APPARATUS AND METHOD OF MAKING SAME

(76) Inventor: Michael P. Young, 684 Air Park Dr., Oceano, CA (US) 93445

( * ) Notice: Subject to any disclaimer, the term of this patent is extended or adjusted under 35 U.S.C. 154(b) by 0 days.

(21) Appl. No.: 10/306,395

(22) Filed: Nov. 27, 2002

(65) Prior Publication Data

US 2003/0097938 A1 May 29, 2003

Related U.S. Application Data

(60) Provisional application No. 60/334,228, filed on Nov. 29, 2001.

(51) Int. Cl.[7] .......................... A23L 1/325; A23P 1/00; B29C 69/00
(52) U.S. Cl. ...................... 426/512; 99/450.2; 99/450.6; 99/450.7; 249/67; 249/108; 425/383; 425/402; 425/412; 425/444; 426/129; 426/643
(58) Field of Search .............................. 426/512, 643, 426/129; 249/67, 108; 99/450.2, 450.5, 450.6, 450.7; 425/383, 402, 412, 444

(56) References Cited

U.S. PATENT DOCUMENTS

| | | | |
|---|---|---|---|
| 4,294,862 A | * 10/1981 | Wilke | 99/450.2 |
| 4,556,379 A | 12/1985 | Ikishima | |
| 4,637,304 A | 1/1987 | Suzuki | |
| 5,009,905 A | * 4/1991 | Ikeda | 426/643 |
| 5,169,231 A | 12/1992 | Suzuki | |
| 5,381,728 A | 1/1995 | Tateno | |
| 5,399,082 A | 3/1995 | Shimizu | |
| 5,482,453 A | 1/1996 | Shimizu | |
| 5,634,396 A | 6/1997 | Isobe et al. | |
| 5,832,813 A | 11/1998 | Shimazu | |
| 5,870,948 A | 2/1999 | Ono | |
| 6,244,169 B1 | * 6/2001 | Shimazu | 99/450.2 |
| 6,465,038 B2 | * 10/2002 | Aoki | 426/512 |

FOREIGN PATENT DOCUMENTS

| | | |
|---|---|---|
| GB | 210261 | 1/1924 |
| WO | WO 03/047364 | 6/2003 |

OTHER PUBLICATIONS

International Search Report dated May 29, 2003 (PCT/US02/38140).
Excerpts from http://www.sushiathome.co.uk/.
Excerpts from http://www.mrslinskitchen.com.
Pamphlet of SILPAT "The Tool for the Pros".
TKG Professional Catalogue pp.238–240.

* cited by examiner

*Primary Examiner*—George C. Yeung
(74) *Attorney, Agent, or Firm*—Dobrusin & Thennisch PC

(57) ABSTRACT

The present invention provides a kit (200) for producing a high quality sushi product with uniformity and at a high rate of production. The kit (200) includes a Nigiri Sushi mold (10, 110) and a California Sushi Roll apparatus (54, 154.) In a preferred embodiment, the kit (200) includes a traditional Japanese bento box (18,20) that houses both the Nigiri Sushi mold (10, 110) and California Sushi Roll (54, 154.) The Nigiri Sushi mold (10, 110) is made up of a mold (12, 112) having several indentations (28, 128) for supporting the preferred ingredients. The Nigiri mold (12, 112) is joined with the plate (14, 114) and is placed in the bottom half of the Japanese bento box (18) to form the lower portion of the Sushi kit (200) of the present invention. The apparatus (54, 154) used to form the California Rolls sits atop an inverted Nigiri mold (12, 112) with plate (14, 114) and includes a roller sheet (56, 156) that is flexibly attached to a base plate (64, 164.)

17 Claims, 8 Drawing Sheets

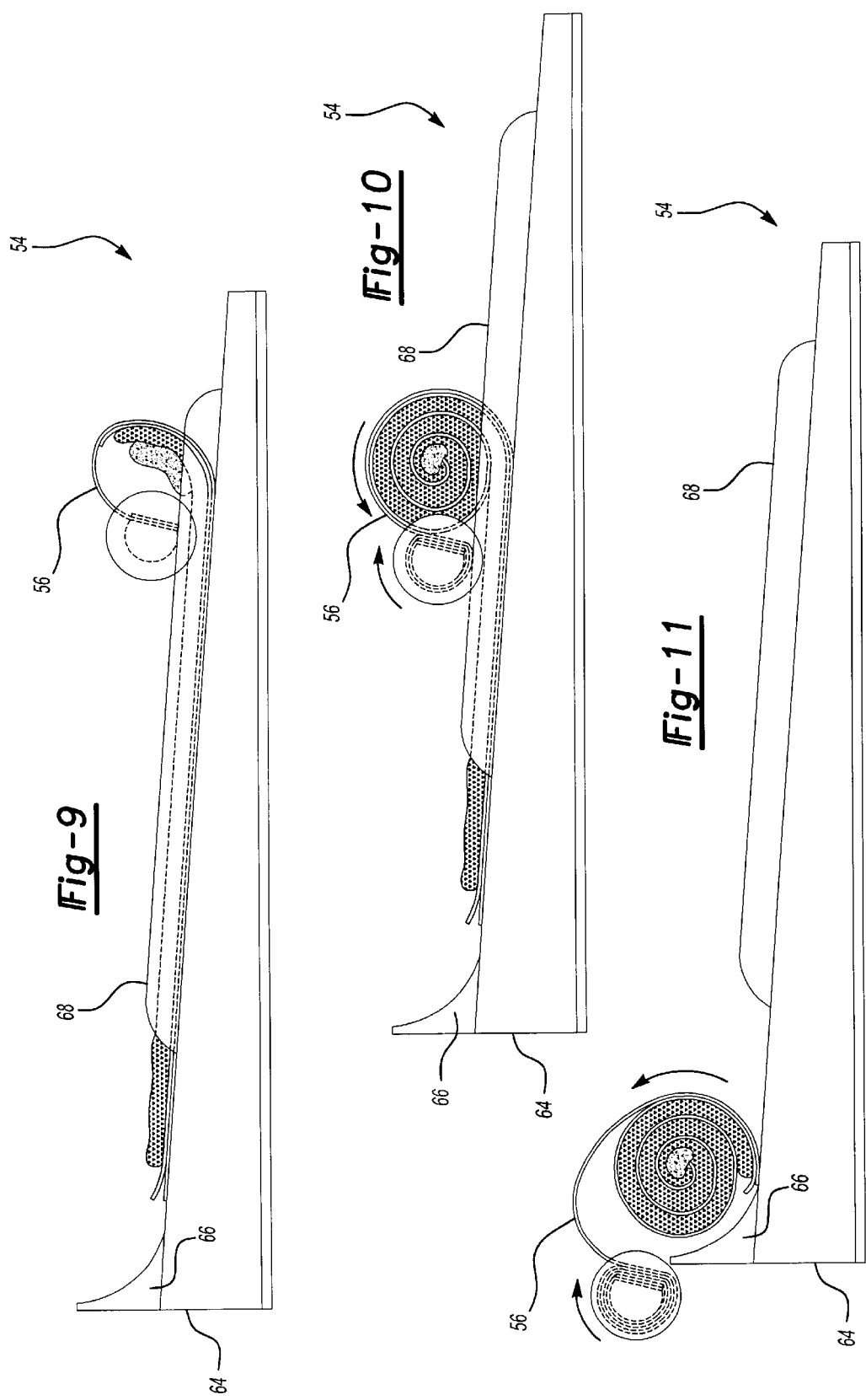

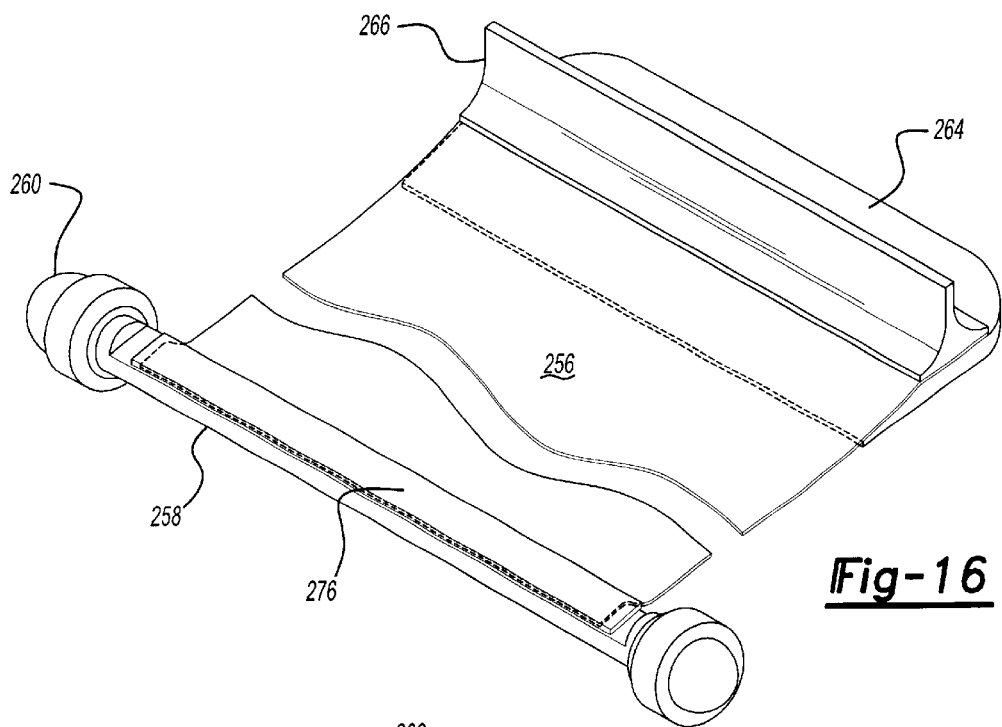
Fig-16
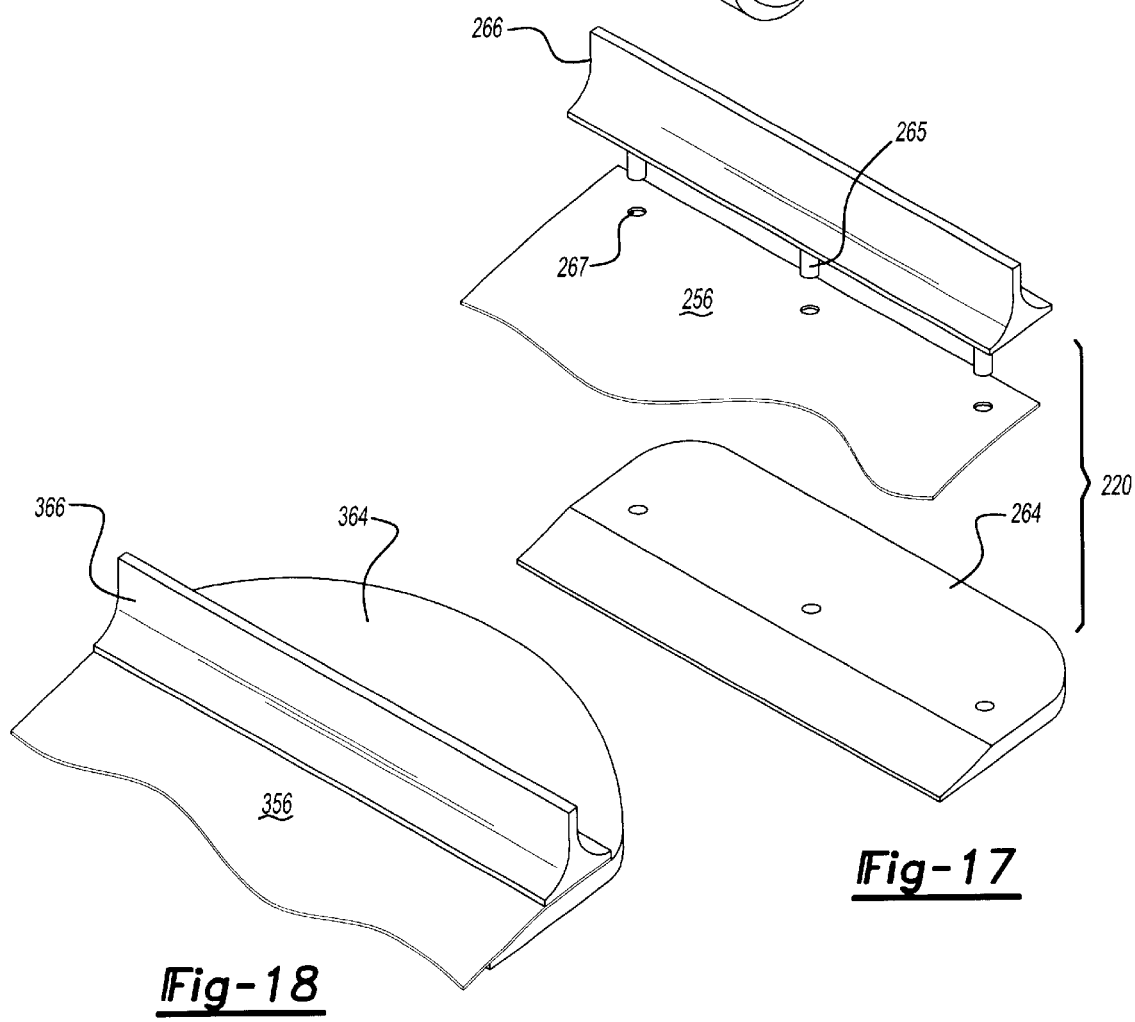
Fig-17
Fig-18

SUSHI MOLD APPARATUS AND METHOD OF MAKING SAME

CLAIM OF BENEFIT OF FILING DATE

The present application claims the benefit of the filing date of U.S. Provisional Application Serial No. 60/334,228 filed Nov. 29, 2001.

TECHNICAL FIELD

The present invention relates to an apparatus and method for making Nigiri Sushi and other Sushi products. More particularly, the present invention provides a kit including an improved molding apparatus and method of making Nigiri, square, rectangular, pentagonal, hexagonal, etc., as well as any polygonal design as well as Maki or California Rolls.

BACKGROUND OF THE INVENTION

In the traditional production and preparation of sushi products, such as Nigiri and Maki Sushi (hereinafter referred to as "Sushi Rolls"), a significant amount of time and effort is required. Nigiri are small ball or oval shaped forms of vinegared boiled rice topped with sliced fish, shellfish or other traditional toppings. The art of Nigiri is in the formation of the rice ball and more particularly, the proper compression of the rice to hold its shape during consumption. Once the rice ball is formed, the topping is added. Production rate and uniformity of the Sushi Roll in restaurant or other food facility requires experience, training, and skill which are all dependent upon the experienced of the chef. The present invention addresses these potential disadvantages of traditional sushi products by providing a method, apparatus, and kit for forming high quality Nigiri Sushi and Sushi Rolls which could be utilized in household, domestic, restaurant, food service, and food production environments.

The Sushi Rolls are thin sheets of seaweed (nori) topped with a layer of vinegared boiled rice and a second layer of crab, fish, or vegetables or other traditional toppings. Traditionally, the nori, rice and toppings are then rolled by hand with a bamboo mat so as to tighten and consolidated the ingredients forming an elongate horizontal roll. The California Roll is then sliced vertically into smaller bite sized pieces. Like Nigiri, the art of the California Roll is forming a compact horizontal roll that will maintain its shape after cutting and during consumption. And like Nigiri, production rate and uniformity for environments such as a restaurant is generally slow even for the most experienced chef.

SUMMARY OF THE PRESENT INVENTION

The present invention provides a kit for producing a high quality sushi product with uniformity and at a high rate of production. The kit includes a Nigiri Sushi mold and a Sushi Roller apparatus. In a preferred embodiment, the kit may include a traditional Japanese bento box that houses both the Nigiri Sushi mold and the selected Sushi Roll. The Nigiri Sushi mold is made up of a mold having several indentations for supporting the preferred ingredients. Each indentation includes an opening at the lowest point or base of the indentation. The mold has rimmed upper area for receiving a plate. The plate is configured with funnels extending from a flat surface and an outer profile similar to the rimmed upper area of the mold. These funnels correspond to the indentations located on the lower mold. An elongated press is provided and is shaped at one end identical to the funnels of the plate and at the other end is shaped identical to the opening at the lowest point of the mold. The outer profiles of both ends of the press are slightly smaller than the openings intended for seating within the plate and mold.

To form Nigiri Sushi, the Nigiri mold is placed on a level surface. A preferred topping is first place within the indentations of the mold. This is opposite the traditional method wherein the topping is placed after the rice ball has been formed. Next, the plate is seated within the mold and Wasabi is applied through various means, such as a tube, followed by vinegared rice being placed within the funnels. The funnel end of the press is used to press and compact the rice into the funnel and the indentations of the mold. The press or push tool may also be utilized by the user to achieve a desired amount of texture, consistency, or compactness of the sushi product The press and the funnel plate are then removed from the top of the mold. The mold is then rotated or turned upside down by the user which then allows gravity to displace the sushi product from the mold when the mold comes into contact with a level surface, such as a counter, assembly line, or food service station. Any remaining sushi product in the mold can then be removed with a press or push tool or instrument. For example, the opposite end of the press is used to gently remove the newly formed Nigiri Sushi from the indentations in the mold by inserting the press end into the openings provided in the bottom of the mold indentations. The Nigiri Sushi may then be served in the bento box, a sushi plate, or any other type of serving platform. Since the rice ball is rotated 180 degrees, the topping is now correctly located on top of the rice ball as tradition dictates.

The apparatus used to form the Sushi Rolls sits atop an inverted Nigiri mold and includes a roller sheet comprising an integrated roller rod, a flexible sheet or material, such as silicone, and a stopper that is flexibly attached to a base plate. In a preferred embodiment, the roller is supported by the Nigiri mold inverted to form a level support surface. A rolling rod with a set of opposing handles may be removably attached to one end of the roller sheet. A stopper may be removably attached to the opposite end of the roller sheet and secures the roller sheet to the base plate.

The California Roll is made by placing a sheet of seaweed on the silicone roller sheet between the rolling rod and the stopper within the edges of the inverted Nigiri mold. A layer of vinegared rice is spread to cover the seaweed. A layer of filling is added on top of the rice and preferably is spaced from the rolling rod. To successfully form the California Roll, the handles of the rolling rod are grasped and move the roller sheet toward the stopper. The roller rod is lifted and turned so that the flat surface of the rod is facing the selected filling. The flat surface (roller slip) is pushed against the filling using a forward motion by the user to push and compact the filling. An example of the rolling method allows a user to effectively form sushi products through a "reverse roll" method or process whereby the user initially manipulates the silicone in a counter-clockwise direction and then manipulates the roller rod in a clockwise direction thereby forming and moving the sushi product along the base plate and toward the user. Although it will be appreciated that the desired manipulation can be either in a clockwise or counter-clockwise motion, it should be seen that the desired technique, method, or process forces the ingredients to roll up forming an elongated cylinder. At the end of this "reverse roll" process, the sushi product itself will generally come into contact with the stopper, thereby positioning the roller slightly below the stopper. If the user continues to manipulate the roller in a clockwise direction, the circumference of the silicone around the roll will decrease in size thus compacting or compressing the rice and other filling to form the desired texture, consistency, and compactness of the desired sushi product. When the cylinder reaches the stopper, the rolling rod is brought back to its original position by the user. Once compacted, the California Roll is removed from the roller sheet and cut vertically into serving size pieces. The Japanese bento box top or inverted bottom may be used as a serving plate.

These and other objects of the present invention will become apparent upon reading the following detailed description in combination with the accompanying drawings, which depict systems and components that can be used alone or in combination with each other in accordance with the present invention.

BRIEF DESCRIPTION OF THE DRAWINGS

FIGS. 8–11 illustrate a method for making a California Sushi Roll with a first preferred embodiment of the present invention.

FIG. 16 illustrates a particular preferred embodiment of the present invention consisting of an integrated roller unit having a generally rectangular shaped footplate.

FIG. 17 illustrates another view of the integrated roller unit of the present invention.

FIG. 18 illustrates yet another embodiment of the integrated roller unit depicting a half-moon shaped design.

DESCRIPTION OF THE INVENTION

Figure 1:
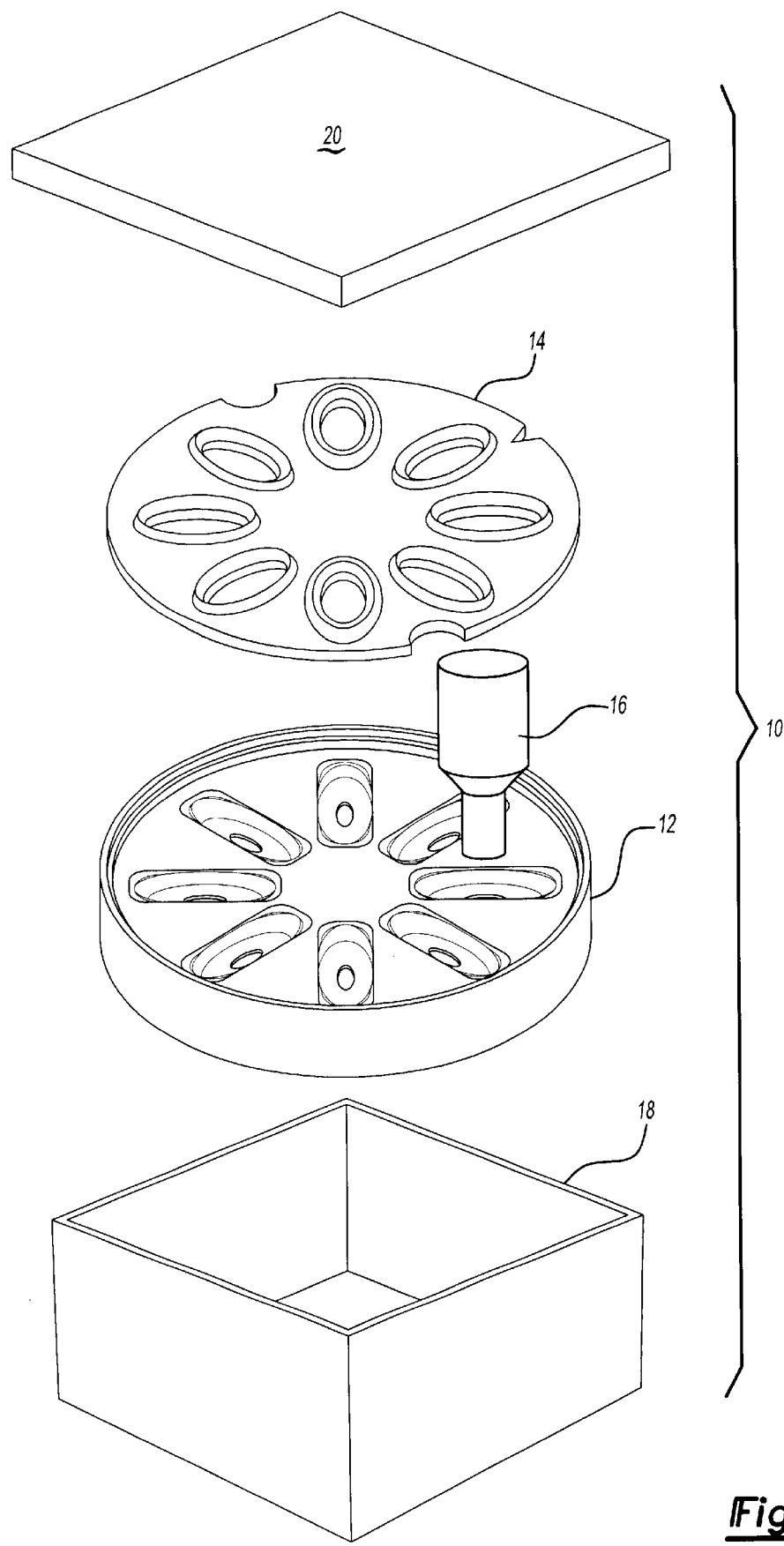
FIG. 1 illustrates an exploded perspective of the present invention.

Referring to FIGS. 1–6, the present invention of a method and apparatus of preparing Nigiri Sushi is illustrated consisting of a Nigiri Sushi mold assembly 10, for receiving rice, a selected portion of fish or other seafood item, vegetables, and selected seasonings (not shown.) It should be appreciated that the present invention can be utilized to form Sushi Rolls and other rolled food products using any type of food items or comestible materials selected by the user for human consumption. The Nigiri Sushi mold assembly 10 is configured with a mold 12, a plate 14, a press 16, and, optionally, a box 18 with a removable lid 20. In a first example of operation, box 18 would be used as storage unit for mold 12, plate 14 and press 16. In a second example of operation, a box 18 may be configured with regions configured to receive and serve the Nigiri Sushi.

Referring now to FIGS. 2–6, mold 12 of the Nigiri Sushi mold 12 is configured with a flat surface 20 and is substantially circular in shape. Preferably mold 12, will be further configured with a lip 22 having an inwardly projecting male key 24, and a supporting leg 26 (FIG. 3) both residing on the outer circumference of mold 12 which project perpendicularly away from flat surface 20. Flat surface 20 is configured with at least one and, more preferably, a plurality of indentations 28 extending radially from the center portion 30 of mold 12. The indentations 28 are supported in part by supporting surface 32 and wall 34 which substantially surrounds both the indentations 28 and the supporting surface 32. The indentations 28 are further configured with an elliptical hole 36 positioned substantially at the center of the indentations 28, which is substantially smaller in both shape and dimension than the indentations 28.

The number of indentations found in the assembly of the present invention would be consistent with the number and size of pieces or portions of individual Nigiri Sushi selected by the user to be served and consumed. However, it is foreseeable that the number of indentations, and orientation thereof, would vary at the point of sale or use and could further be configured in any number of sizing. For example, it is contemplated that the present invention could be commercialized as an individual serving size product, a family size product, a commercial size product for the large scale preparation of sushi such as in a restaurant, food service, or food manufacturing facility or any other size or shape that is desired by the consumer. Furthermore, it is foreseeable that the indentations found in the present invention may vary in size and shape as serving portions and comestible materials used to form the Sushi may vary according to taste, size of group, etc.

Figure 4:
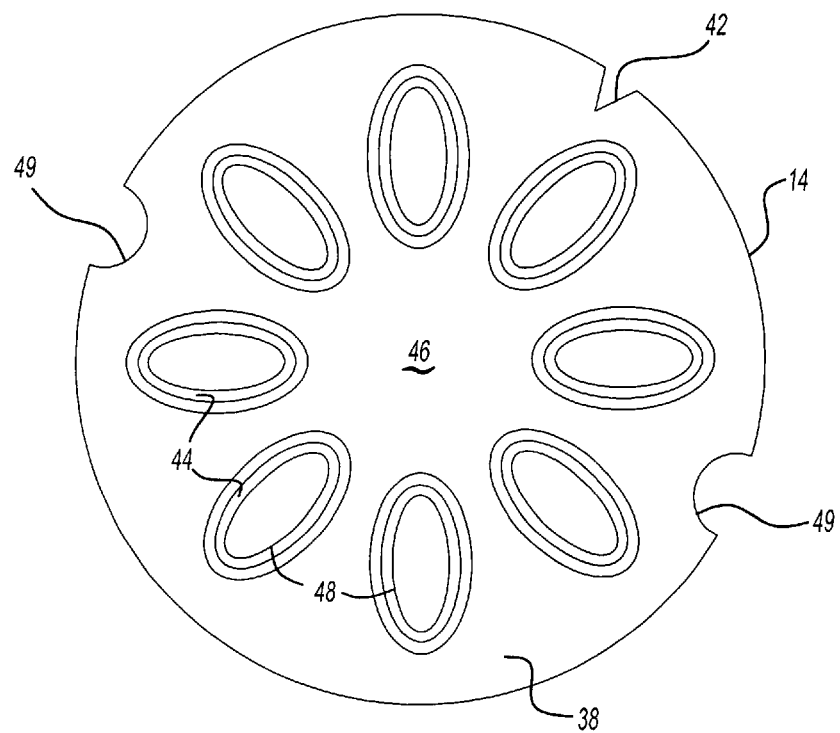
FIG. 4 illustrates a top view of an alternative embodiment of a plate of the present invention.
Figure 3:
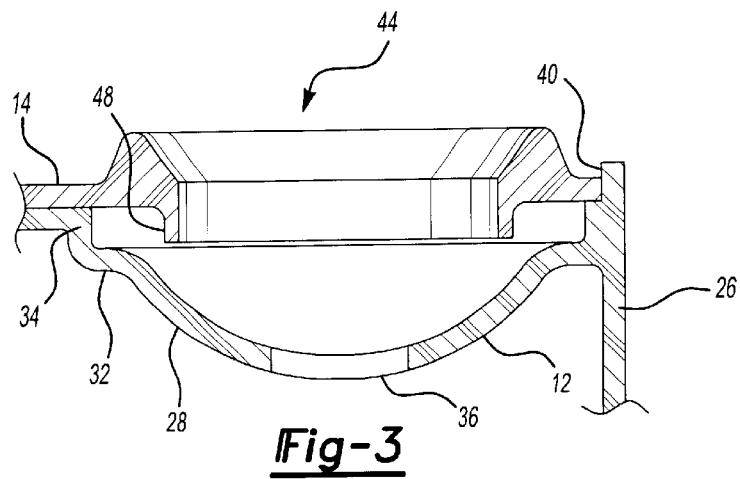
FIG. 3 illustrates a cross-sectional view of the mold in FIG. 2.
Figure 5:
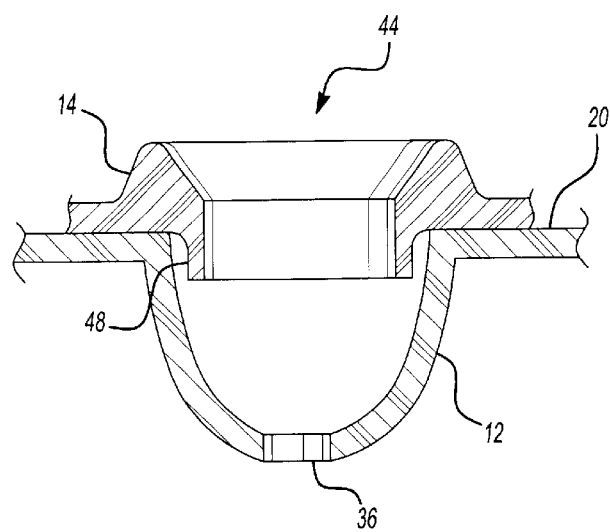
FIG. 5 illustrates a cross-sectional view of an alternative embodiment of a mold of the present invention.

Referring to FIGS. 3–5, a plate 14 is configured with a flat surface 38 having an outer circumference similar in size and shape to the inner surface 40 of lip 22. Plate 14 is further configured with an inwardly recessed female key 42 for receiving male key 24 causing mold 12 and plate 14 to become aligned. Plate 14 is yet further configured with a plurality of funnels 44 which extend radially from the center portion 46 of plate 14 which are in alignment with indentations 28. Opposing finger holes 49 are provided along the outer circumference to aid in removing the plate 14 from the top of the mold 12 after the Nigiri Sushi has been formed.

Referring specifically to FIGS. 3 and 5, when the plate 14 and mold 12 are in alignment and flush with each other, extending member 48 of funnel 44 partially resides in at least one of the indentations 28. The shape and size of extending member 48 is substantially similar to that of the outer area of at least one of the indentations 28.

The number of funnels 42 may be equal to that of the number of indentations 28 of the mold 12. However, it is foreseeable the number of funnels 42 are more or less than the number of indentations 28. This may be preferable when it is desired to create mold 12 and plate 14 configurations to obtain a specific number of servings.

Figure 6:
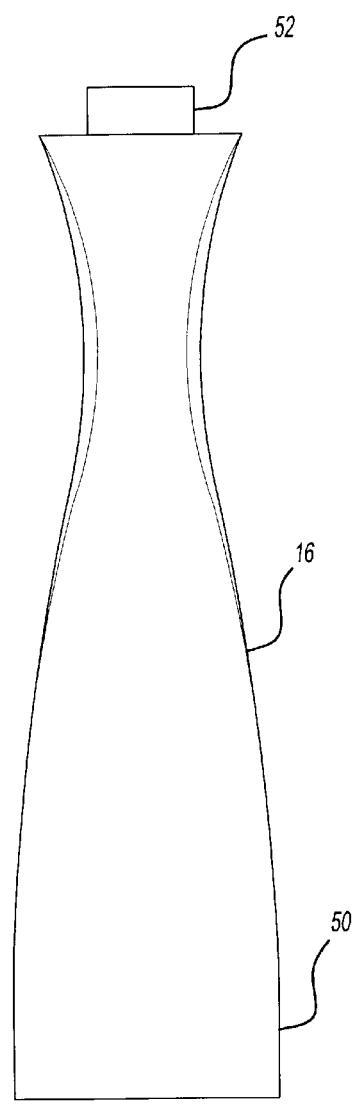
FIG. 6 illustrates an elevational view of a preferred embodiment of a press of the present invention.

Referring now to FIG. 6, other important features of the present invention include the use of a press 16 which is illustrated as having a first end 50 and a second end 52. The first end 50 has a cross sectional shape substantially similar to that of the opening of funnel 44 such that the first end 50 can unobtrusively enter in and through funnel 44 and extending member 48. The second end 52 has a cross sectional shape substantially similar to that of the elliptical hole 36 residing in the bottom of the indentations 28 such that the second end 52 can fit unobtrusively through elliptical hole 36.

Alternative embodiments of the base plate 64, 264 may be employed with the invention and include a scalloped edge, rounded edge (as shown in FIG. 18), swuared edge (as shown in FIG. 17), or any other design and shape that provides guidance in the making of Sushi, and particulary a California Roll, as described below.

METHOD OF MAKING NIGIRI SUSHI OF THE PRESENT INVENTION

The present invention also comprises a method of making Nigiri Sushi utilizing the apparatus and device described above. In a preferred embodiment of the methodology employed for making Nigiri Sushi, a Nigiri Sushi mold assembly 10 is used to combine selected ingredients (e.g. a fish portion, a seafood portion, rice, vegetables, selected seasonings, as well as any other type of comestible material consumed by humans) as well as any other ingredient or combination of ingredients typically used in the making of Nigiri Sushi.

Referring to FIGS. 1–6, the supporting leg 26 of the mold 12 is placed on a substantially flat surface such that the plurality of indentations 28 and elliptical hole 36 are fully exposed. The user then places the selected fish or seafood portion, typically found in Nigiri Sushi, in each of the indentations 28 of the mold and applies seasonings to the chosen portions. It is contemplated that the types of seafood or fish items that may be incorporated within Sushi, as well as the seasonings used in the making of Nigiri Sushi, are well known in the art and may vary between applications and the specific taste of the user or consumer. It may be desirous to omit all spices at this stage or only use spices at this stage depending upon taste or a customer's preferences.

A plate 14 is placed over mold 12 and aligned through keys 24 and 42 as previously discussed. The plate is then substantially seated into the opening created by lip 22 and onto the flat surface 20 of the mold 12. This results in the funnels 44 of the plate 14 being aligned with the indentations 28 of the mold 12.

Cooked rice is then placed within and partially through each of the funnels 44 and onto the fish portions residing in each of the indentations 28. The rice is then packed further into the indentations 28 forming a semi-ball shaped mound. This is accomplished by inserting first end 50 of the press 16 through the funnel 44 opening and at least partially into the extending member 48 resulting in an applied force to the cooked rice. Once the rice residing in the indentations 28 is compressed to the desired amount the press 16 and plate 14 are removed from the opening created by the lip 22 of mold 12.

The box 18, which is configured to additionally be a serving tray, is positioned such that the serving surface is placed on top of the cooked rice and mold 12. The mold and box 18 are simultaneously turned over and the second end 52 of the press 16 is inserted into elliptical hole 36 to aid in gently removing the sushi from the mold 12. The mold 12 is then lifted out of the box 18 thus presenting the final product of the Nigiri Sushi arranged in the box 18. This process is then repeated until the desired amount of Nigiri Sushi is created.

Figure 12:
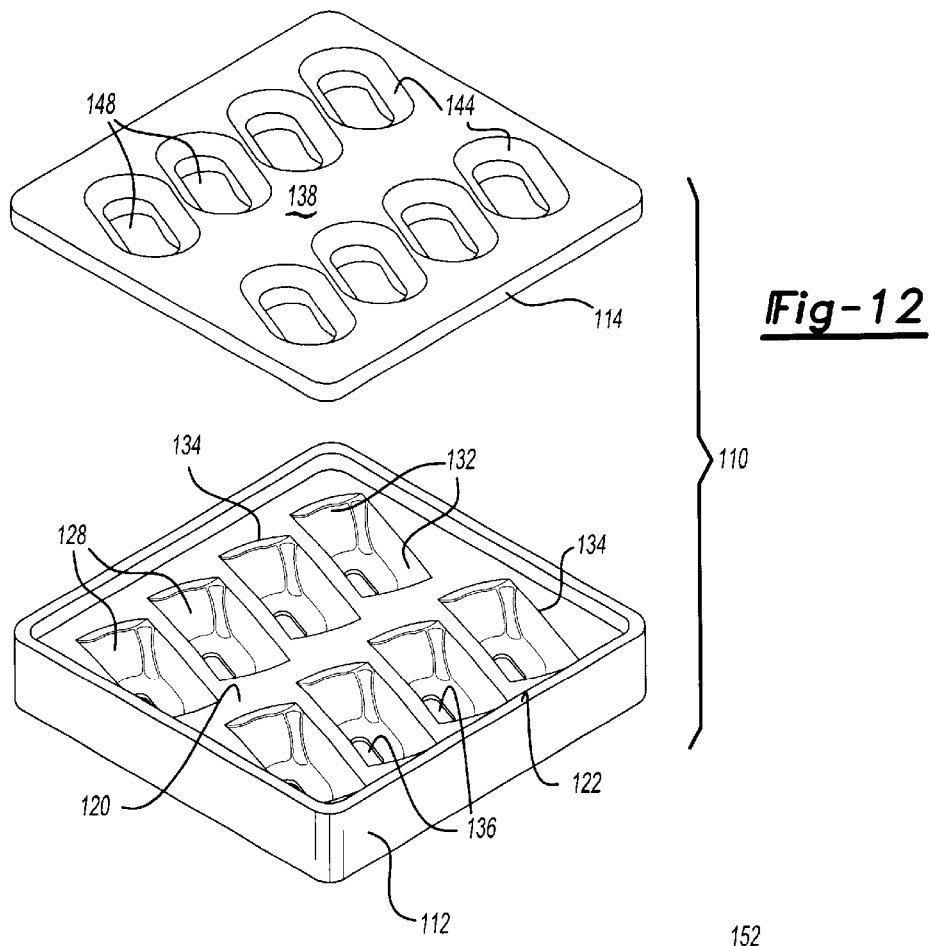
FIGS. 12–13 illustrate a method for making Nigiri Sushi with a particularly preferred embodiment of a square-shaped Nigiri Sushi mold of the present invention.

As illustrated in FIGS. 1 and 12, mold 12 and plate 14 may be of any size or shape. FIG. 1 illustrates a round mold and plate and FIG. 12 illustrates a rectangular shaped mold and plate. Other polygonal shapes are envisioned such as a rectangular shape with rounded corners, a square, or rhombus, for example. Additionally, other rounded shapes a envisioned such as an oval. Regardless of shape, the plate is preferably seated within the mold to aid in creating the Nigiri Sushi of the present invention.

Figure 7:
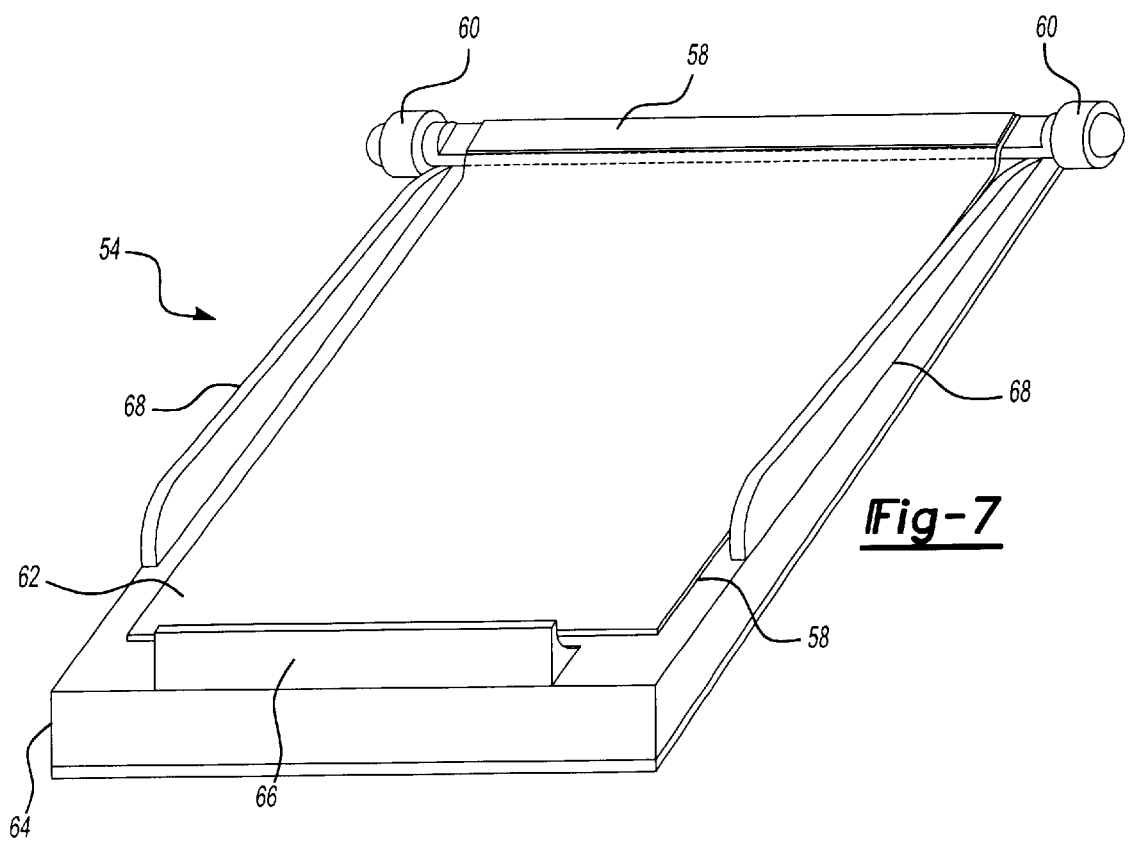
FIG. 7 illustrates a perspective view of a first preferred embodiment of a California Sushi Roll apparatus of the present invention.
Figure 8:
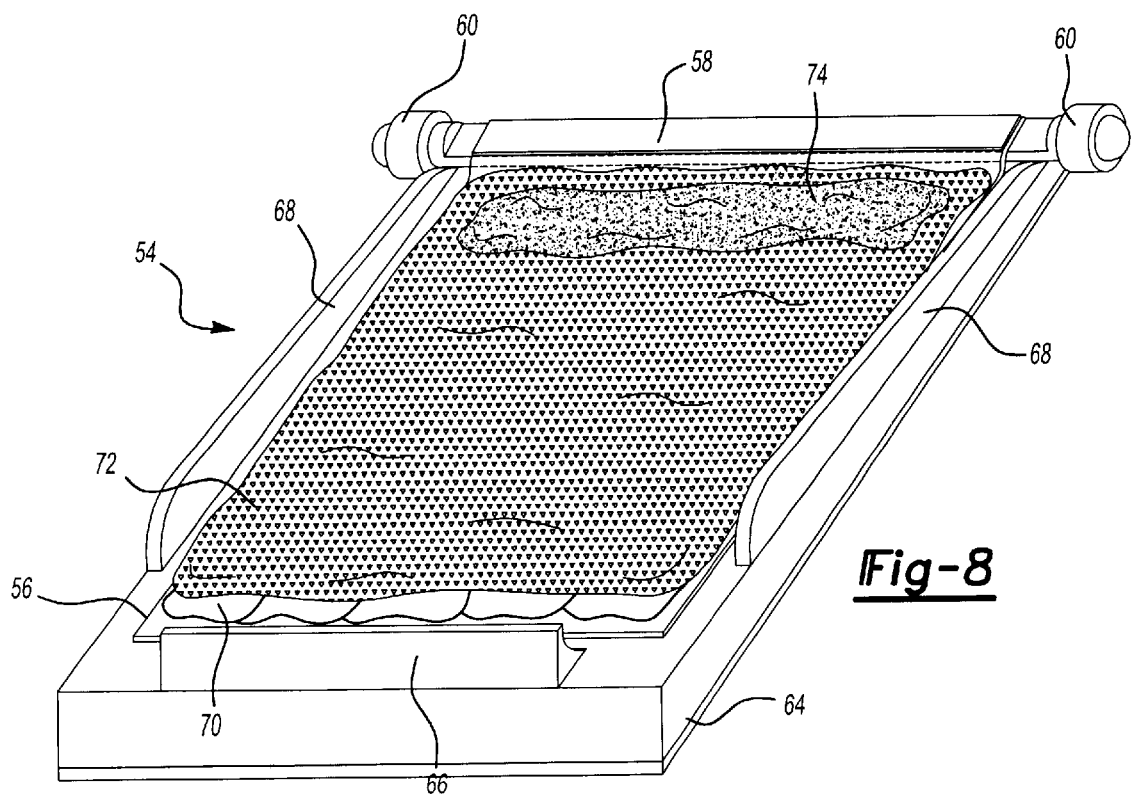

In another embodiment of the Sushi Roll apparatus of the present invention, more fully shown and described in FIGS. 7–11, a method and apparatus for molding and forming traditional sushi pieces, such as California Rolls is shown and described. More particularly, in this embodiment, a Sushi Roll Apparatus 54 is disclosed which utilizes a roller sheet 56 having an attached rod 58 with two ends or handles 60 used to physically roll and form the chosen food items into a piece of Sushi. In a particular preferred embodiment which has a number of manufacturing and marketing advantages, it is contemplated that this function can be achieved through the use of an integrated roller unit 220, as illustrated in FIGS. 16–18, which consists of a unitary or attached assembly of the roller sheet 256, rod 258, and a roller slip or securing strip 264, which is a generally rectangular piece having a plurality of pegs 174 which engage with the openings 172 of the flexible material and into the holes or receptacles 161. As shown in FIGS. 16–18, the integrated roller unit embodiment utilizes a generally rectangular-shaped footplate having the plurality of pegs 174 in unitary engagement with the flexible material, such as a silicone sheet, and a rollstop. The pegs 174 engage with the openings 172 of the flexible material and into the holes or receptacles 161 (not shown) which aids in stabilizing the stopper. The roller unit further comprises a nonskid sole or under portion consisting of a rubber or other non-skid materials which further increases stability and reduces inadvertent or unwanted movement. This embodiment provides substantial timesaving in the making of properly formed and dimensioned sushi pieces by the user. In addition, these features may provide components which are more hygienic and easier to clean in food service, food preparation, or food manufacturing environments subject to health codes and regulations. For example, the rice and other materials may be readily released which would be advantageous to novice chefs or less skilled food preparation personnel. The roller sheet 56 is comprised of a flexible material bonded at one end 62 to a base plate 64 of a chosen dimension. In FIG. 7, the base plate 64 is approximately 8 inches by 8 inches, but can be in any size. The bottom of the base plate 64 has a slight incline of approximately one-quarter of one inch which acts as a stopping means 66 at the end of the rolling process when the chosen piece of Sushi is completed. Guide rails 68 may also be provided to aid in rolling the roller sheet 56 along the base plate 64.

Alternative embodiments of the base plate 64,264 may be employed with the invention and include a scalloped edge, rounded edge (as shoen in FIG. 18), squared edge (as shown in FIG. 17), or any other design and shape that provides guidance in the making of Sushi, and particularly a California Roll, as described below.

METHOD OF MAKING A CALIFORNIA ROLL OF THE PRESENT INVENTION

With reference to FIGS. 8–11, a sheet of seaweed 70 is placed on roller sheet 56. The seaweed should be sized to fit to the inside edge of guide rails 68, if provided, and to the inside edge of the roller rod 58 and bottom edge 62 toward the stopping means 66 of base plate 64. A layer of sushi rice 72 is spread on top of this sheet to cover the seaweed. If guide rails 68 are provided in the embodiment, the rice is preferably spread to the guide rails 68 and out to the roller rod 58 and bottom edge 62 of roller sheet 56. A filling 74 (e.g. crab meat, Avocado, or other fillings) is then placed across the layer of rice approximately 1½" from the roller rod 58 toward the stopping means 66. Holding both handles 60, the user picks up the top end of the roller sheet 56, pulling the handles 60 and roller sheet 56 towards the bottom edge 62 and the stopping means 66, thus rolling up a cylinder shaped Sushi Roll. When the sushi roll reaches the bottom edge 62, the roller sheet 56 is draped over the stopping means 66 down to table level. Using both hands, the user compresses the sushi roll between the roller sheet 56 and the stopping means 66, with light but firm pressure. This will form a finished roll. The roller sheet 56 is pulled back to its original position and the cylinder shaped sushi roll is removed from the stopping means 66. Finally, the sushi roll is cut with a sharp knife into approx. 8 pieces depending on the desired serving size.

With reference to FIGS. 12–15, another preferred embodiment of the present invention is there shown and includes a second preferred embodiment of a Nigiri Sushi mold 110 and a second preferred embodiment of a California Roll apparatus 154 for use in conjunction with the Nigiri Sushi mold 110. This embodiment is shaped so that both apparatus of the present invention may be stacked and fit neatly within a box 18 with lid 20 (FIG. 1) to form a sushi kit 200. The kit 200 is compact and is easily stored as a unit that can readily be formed into a Nigiri Sushi mold 110 and may also be quickly and easily assembled for making California Rolls.

Figure 2:
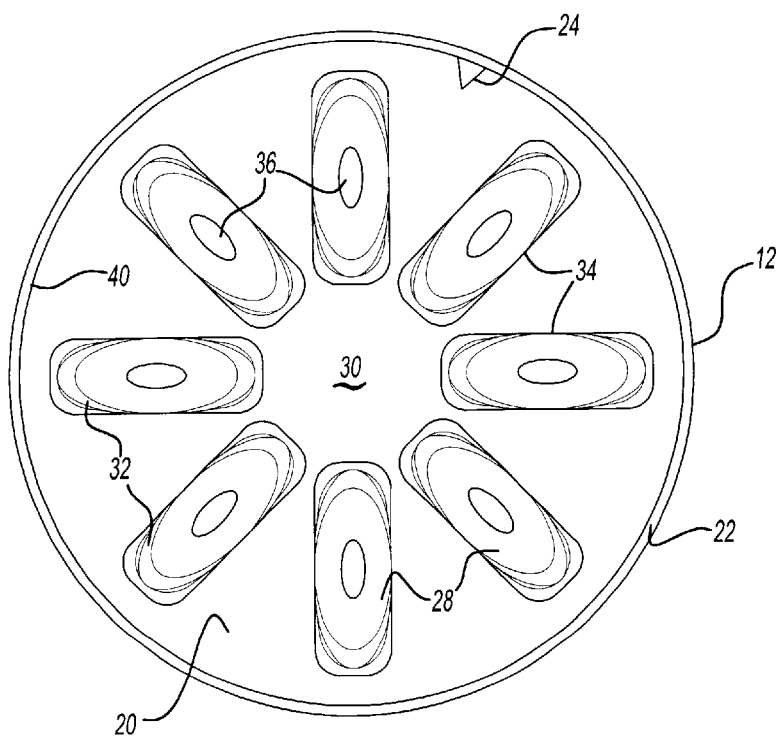
FIG. 2 illustrates a top view of an alternative embodiment of a mold of the present invention.
Figure 13:
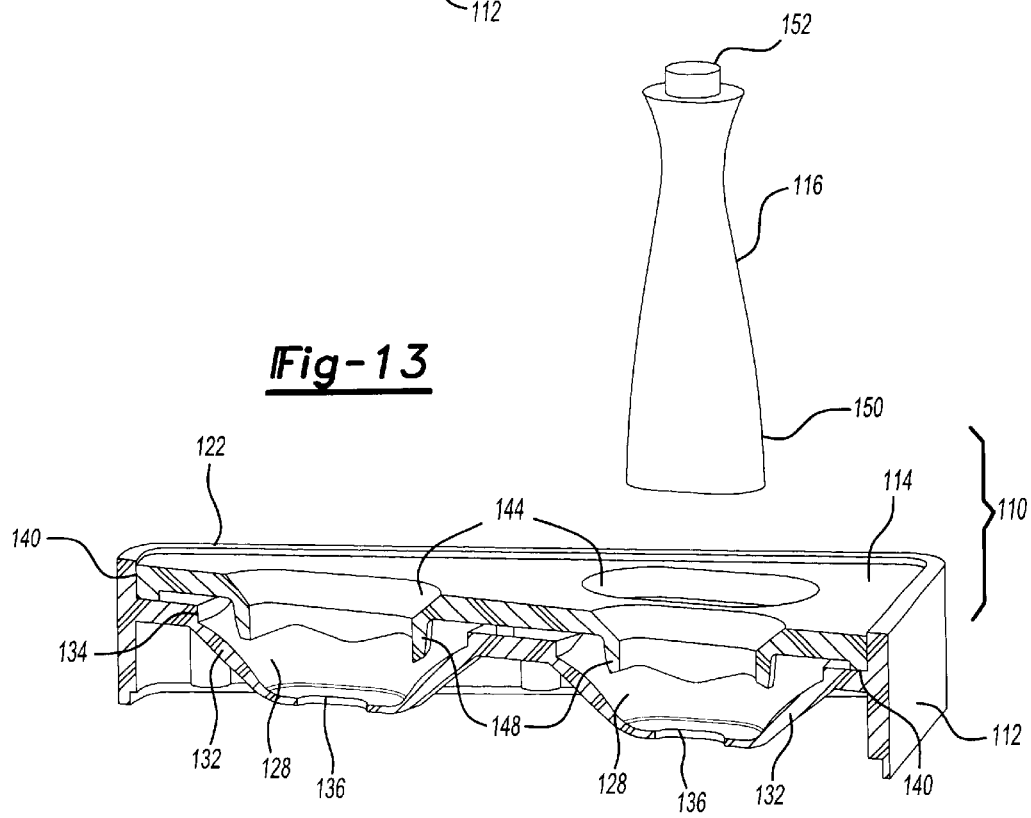

In a particularly preferred embodiment, FIGS. 12 and 13 illustrate a Nigiri Sushi mold 110 for use with the Sushi kit 200. The Nigiri Sushi mold assembly 110 is configured with a mold 112, a plate 114, a press 116 and a box 18 with a removable lid 20 (FIG. 1.) In a first example of operation, box 18 would be used as storage unit for mold 112, plate 114 and press 116. In a second example of operation, box 18 would be configured with regions configured to seat and serve the Nigiri Sushi. Mold 112 and plate 114 are of a rectangular configuration allowing for the plate 114 to readily set on lip 122 (FIG. 13) without the need for a male and female key arrangement as illustrated in FIGS. 1, 2 and 4.

The mold 110 includes a flat surface 120 that is configured with at least one and, more preferably, a plurality of indentations 128 extending longitudinally along the flat surface 120 of mold 112. The indentations 128 are shown at an angle but may be provided in any configuration. The indentations 128 are supported in part by supporting surface 132 and wall 134 which substantially surrounds both the indentations 128 and the supporting surface 132. The indentations 128 are further configured with an elliptical hole 136 positioned substantially at the center of the indentations 128, which is substantially smaller in both shape and dimension than the indentations 128.

A plate 114 is configured with a flat surface 138 having an outer profile similar in size and shape to the inner surface 140 of lip 122. Plate 114 is further configured with a plurality of funnels 144 which extend longitudinally along the flat surface 138 of plate 114 which are in alignment with indentations 128. Opposing finger holes 149 (FIG. 15) are provided along the outer circumference to aid in removing the plate 114 from the top of the mold 112 after the Nigiri Sushi has been formed.

Referring specifically to FIG. 13, when the plate 114 and mold 112 are in alignment and flush with each other, extending member 148 of funnel 144 partially resides in at least one of the indentations 128. The shape and size of extending member 148 is substantially similar to that of the outer area of at least one of the indentations 128.

The number of funnels 142 may be equal to that of the number of indentations 128 of the mold 112. However, it is foreseeable the number of funnels 142 are more or less than the number of indentations 128. This may be preferable when it is desired to create mold 112 and plate 114 configurations to obtain a specific number of servings. It is contemplated that the funnels 142 may further comprise a spout or wave-shaped bottom edge which can assist in the formation of the rice into the desired oval or ball shape and allows the selected seafood item to shape and meet the respective contours.

Other important features of the present invention include the use of a press 116, which is illustrated as having a first end 150 and a second end 152. The first end 150 has a cross sectional shape substantially similar to that of the opening of funnel 144 such that the first end 150 can unobtrusively enter in and through funnel 144 and extending member 148. The second end 152 has a cross sectional shape substantially similar to that of the elliptical hole 136 residing in the bottom of the indentations 128 such that the second end 152 can fit unobtrusively through elliptical hole 136.

Figure 14:
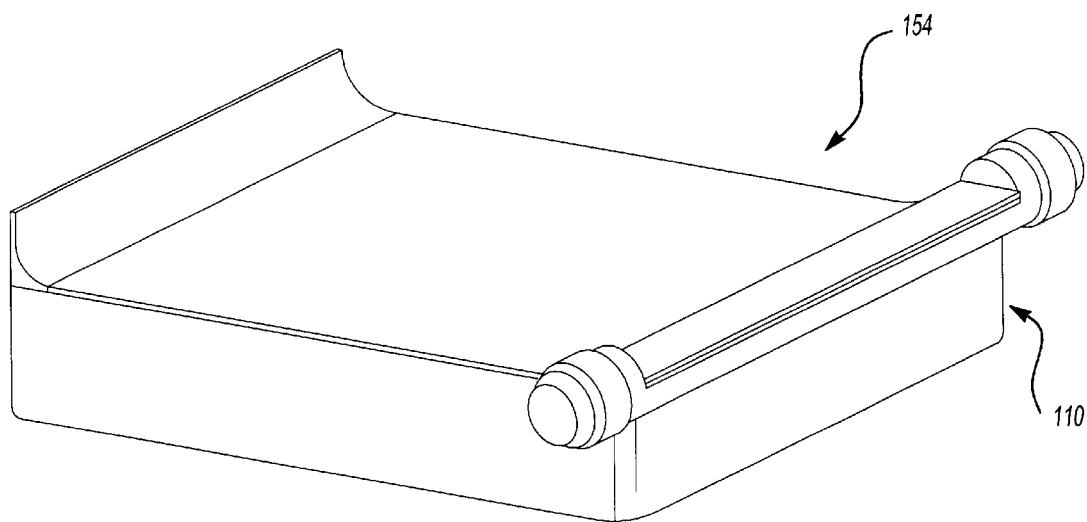
FIG. 14 illustrates a perspective view of a preferred embodiment of a California Sushi Roll apparatus of the present invention.
Figure 15:
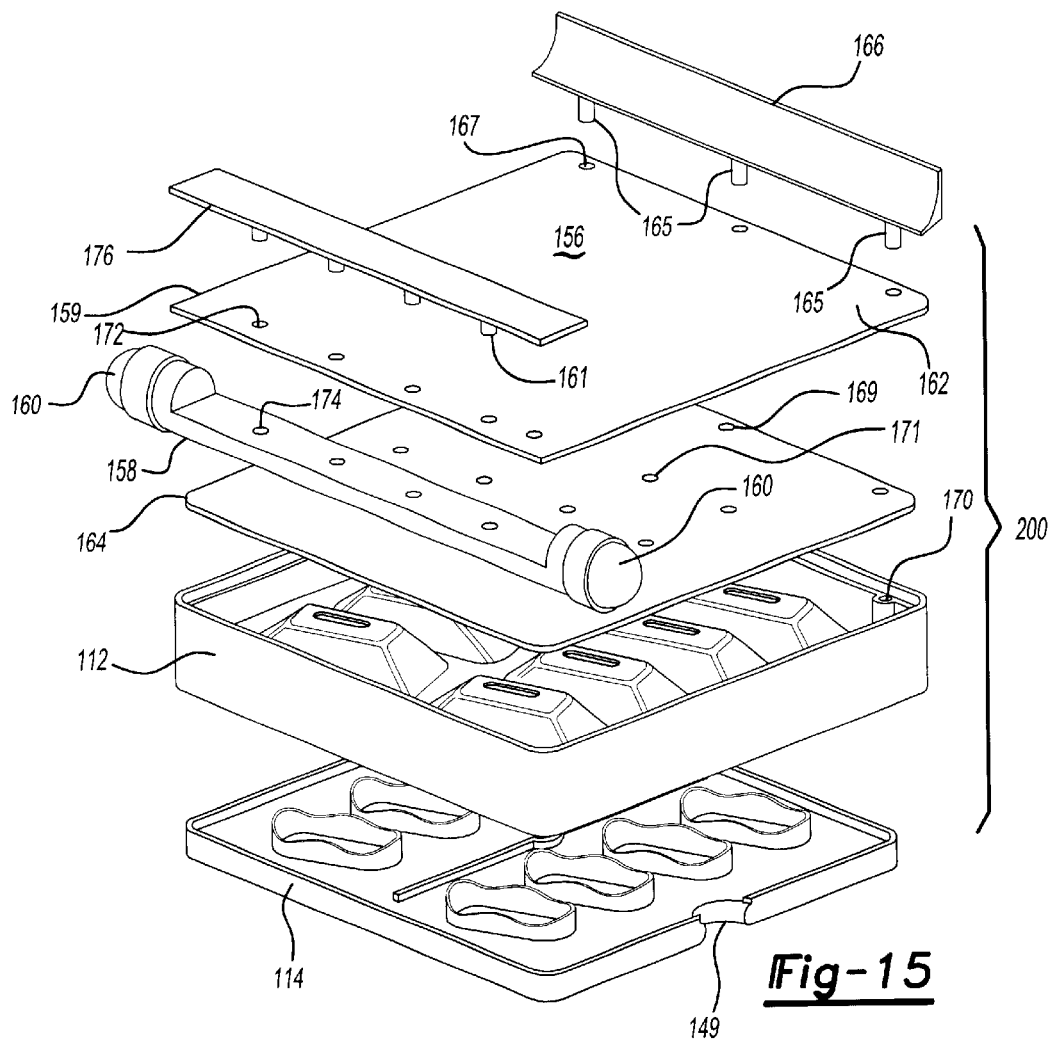
FIG. 15 illustrates an exploded view of a kit including the Sushi apparatus of the present invention.

With reference to FIGS. 14 and 15, a second preferred embodiment is there shown for a method and apparatus for molding and forming traditional sushi pieces, such as California Rolls. More particularly, in this embodiment, a Sushi Roll Apparatus 154 is disclosed which utilizes a roller sheet 156 having an attached rod 158 with two ends or handles 160 used to physically roll and form the chosen food items into a piece of Sushi. The rod 158 is attached to a free end 159 of roller sheet 156 by attaching means such as pegs 161 extending downwardly from the securing strip 176 through the roller sheet 156 for attachment to a roller rod 160 via corresponding openings 172,174. The roller sheet 156 is comprised of a flexible material bonded at one end 162 to a base plate 164 of a chosen dimension that has a plurality of holes 171 and seats within the inverted mold 112 and plate 114 of the Nigiri Sushi mold 110 illustrated in FIGS. 12–13. Attaching means such as pegs 165 extend downwardly from stopping means 166 through corresponding openings 167 in one end 162 of the roller sheet 156 and openings 169 in base plate 164 and aligning with peg support holes 170 in the inverted mold 112.

As best shown in FIGS. 14 and 15, the Sushi Roll apparatus 154 uses the inverted Nigiri Sushi mold 110 as a support base. To form the California Roll apparatus 154, the plate 114 of the Nigiri Sushi mold 110 is inverted and supports the inverted mold 112. Rod 158 is attached to roller sheet 156 by inserting pegs 161 through openings 172 and subsequently through openings 174 in securing strip 176. Securing strip 176 may be made of any material, such as rubber, plastic, or silicone, that is rigid and will provide temporary or permanent securing means for supporting the rod 158 to the roller sheet 156 when in use. Stopping means 166 is removably secured to the support base 112 by extending pegs 165 through openings 165,167 for insertion into support holes 170 in the support base 112. The Sushi Roll apparatus 154 is shown in its functioning form in FIG. 14. As described above in detail, the method for making and using the Nigiri Sushi mold and Sushi Roll apparatus are used to form sushi. The box 18 with lid 20 may be used as serving pieces for the sushi when not being used to store the kit 200.

Although the invention has been described with particular reference to certain preferred embodiments thereof, variations and modifications can be effected within the spirit and scope of the following claims.

What is being claimed is:

1. A method of making Nigiri Sushi comprising the steps of:
   a. inserting a selected comestible item within a mold having at least one indentation, said indentation defining an opening substantially smaller then said selected comestible item;
   b. applying seasonings to said comestible items;
   c. covering said mold substantially with a plate configured with a funnel aligned over each said indentation;
   d. inserting cooked rice through said funnel and onto said comestible item;
   e. pressing said cooked rice further into said indentation with a first end of a press;
   f. removing said plate from said mold and covering said mold with a serving plate;
   g. rotating said serving plate and mold upside down and inserting a second end of said press through said opening of said mold such that removal of said mold from said serving plate will leave at least one serving of Nigiri Sushi per indentation.

2. The method of claim 1, wherein said mold is configured with a plurality of said indentations and said funnels.

3. The method of claim 1, wherein said serving plate is a portion of a box which houses a portion of said mold, said plate and said press.

4. The method of claim 1, wherein said funnel of said plate aligns with said indentation of said mold.

5. A kit for use in a method of making Nigiri Sushi comprising the components of:
   a. a mold having at least one indentation, said indentation defining an opening;
   b. a cover plate suitable for covering said mold, said plate configured with a funnel aligned over each of said indentations;
   c. a press for the insertion of a selected comestible item through said funnel;
   d. said press having a first end and a second end;
   e. wherein said cover plate is removed from said mold and said mold is rotated upside down for inserting said second end of said press through said opening of said mold such that removal of said cover plate from said mold will leave at least one serving of Nigiri Sushi per indentation.

6. The kit of claim 5, wherein said mold and said plate are inverted to form a base plate and further comprising:
   a roller sheet removably secured to said base plate wherein said roller sheet is comprised of a flexible material securely bonded to said base plate; said roller sheet having a rod attached at one end to facilitate a rolling process for the formation of sushi having preselected and chosen food items.

7. The kit of claim 6, wherein said serving plate is a portion of a box which houses said kit.

8. A kit for use in a method of making Sushi comprising the components of:
   a. a base plate of substantially square or rectangular design having two ends, wherein one end is slightly inclined;
   b. a roller sheet secured to said base plate wherein said roller sheet is comprised of a flexible material securely bonded to said base plate;
   c. said roller sheet having a rod attached at one end to facilitate a rolling process for the formation of sushi having preselected and chosen food items.

9. The kit of claim 8 wherein the Sushi comprises a Sushi Roll.

10. The kit of claim 8, said base plate further comprising at least two components, wherein said components are a mold and a plate that upon inversion form a Nigiri Sushi mold.

11. A method for making sushi comprising the steps of:
    a. placing a sheet of seaweed on top of a roller sheet; wherein said roller sheet is removably secured to a base plate and is comprised of a flexible material securely bonded to said base plate; said roller sheet having a rod attached at one end to facilitate a rolling process for the formation of sushi having preselected and chosen food items;
    b. spreading sushi rice over said sheet of seaweed;
    c. adding a selected comestible item forming a filling to the upper portion of said seaweed sheet and said sushi rice;
    d. rolling said roller sheet about itself and thereby rolling said seaweed sheet with said sushi rice and said filling forming a cylinder shaped sushi roll;
    e. removing said cylinder shaped sushi roll from said base;
    f. cutting said sushi roll into several bite size pieces; and
    g. serving said sushi on a serving plate.

12. The method of claim 11, wherein said base plate further comprises at least two components, wherein said components are a mold and a plate that upon inversion form a Nigiri Sushi mold.

13. The method of claim 12, said mold having at least one indentation, said indentation defining an opening and said plate is suitable for covering said mold, said plate configured with a funnel aligned over each of said indentations and further comprising:
    a press for the insertion of a selected comestible item through said funnel; said press having a first end and a second end wherein said plate is removed from said mold before said mold is rotated upside down and said second end of said press is inserted through said opening of said mold such that removal of said plate from said mold will leave at least one serving of Nigiri Sushi per indentation.

14. The method of claim 13, wherein said mold is configured with a plurality of said indentations and said funnels.

15. The method of claim 13, wherein said serving plate is a portion of a box which houses a portion of said mold, said plate and said press.

16. The method of claim 13, wherein said funnel of said plate aligns with said indentation of said mold.

17. The kit of claim 10, wherein said Nigiri Sushi mold further comprises:
    a mold having at least one indentation, said indentation defining an opening;
    a cover plate suitable for covering said mold, said plate configured with a funnel aligned over each of said indentations; and
    a press for the insertion of a selected comestible item through said funnel; said press having a first end and a second end, whereby removing said plate from said mold before inverting said mold will leave at least one serving of Nigiri Sushi per indentation for removal from said inverted mold by inserting said second end of said press through said opening of said mold.

* * * * *